Patented Sept. 25, 1934

1,974,810

UNITED STATES PATENT OFFICE 1,974,810

POLYGLYCOL ESTERS OF PHENOXY FATTY ACIDS

Michael N. Dvornikoff, St. Louis, Mo., assignor, by mesne assignments, to Monsanto Chemical Company, a corporation of Delaware No Drawing. Application June 9, 1930,
Serial No. 460,101

4 Claims. (Cl. 260—103)

My invention relates to a novel class of organic compounds adapted for use in the manufacture of synthetic resins and nitrocellulose containing compositions.

One object of this invention is to provide a class of novel compounds which is particularly suited for use in the resin and lacquer arts.

Heretofore the di-benzoic acid ester of ethylene glycol, as well as the corresponding neutral ester of glycerine, have been recommended as plasticizers for nitrocellulose and acetyl cellulose. For various reasons, including their lack of retentivity and limited solubility, these simple benzoate esters of polyhydroxy alcohols have not met with favor.

I have now discovered that the neutral esters formed by the interaction of polyglycols and monocarboxylic acids containing an aromatic nucleus, such as phenoxy fatty acid, are excellent plasticizers in that they are light stable, colorless, insoluble in water, non-volatile, possess high degrees of retentivity, are well suited for the manufacture of products containing nitrocellulose, acetyl cellulose or mixtures thereof and may be made of readily available materials.

Polyglycols are essentially polyhydroxy alcohols containing ether groups. They may be made conveniently by combining two molecules of polyhydric alcohols with the elimination of water. Thus, for example, when ethylene glycol is condensed, water splits off and di-ethylene glycol is formed. Further condensation results in the formation of the higher polyglycols, such, for example, as triethylene glycol. In an analogous manner one may prepare the mixed glycols by condensing ethylene glycol with propylene glycol in which case ethylene propylene glycol is formed.

When these polyhydric ether compositions are heated with benzoic acid or are caused to react with benzoyl chloride they form neutral esters in a manner which is characteristic of ester formation and well known to those skilled in the art. Thus, for example, when di-ethylene glycol is caused to react with benzoyl chloride in the presence of a caustic soda solution the di-ethylene glycol di-benzoate is formed, which can be separated, washed with water and dried. The product is a colorless liquid at ordinary temperatures and has an extremely high boiling point. I have heated the di-benzoate ester to 270° C. at which temperature there is evidence of slight decomposition but have been unable to distill the product even at pressures as low as 5 mm. These esters may be made in any well known manner other than that described above. Thus, for example, in lieu of the acid chloride one may employ the acid itself in which case calculated proportions of the acid and alcohol are heated together with or without a small amount of catalyst, such, for example, as sulphuric acid, and preferably under reduced pressure in order to facilitate the removal of the water. Although the esters have extremely high boiling points and cannot be distilled without special equipment, it is possible to obtain a clear, colorless product without distillation.

I am aware that it has been proposed heretofore to form resinous compositions by causing polycarboxylic acids to react with polyglycols. These products, however, are of an indefinite composition and polymerize or condense easily to form resinous solids. The esters disclosed herein are easily distinguishable thereover in that they are definite chemical compositions that may be heated below their decomposition temperature for protracted periods without any change in their physical characteristics. I am likewise aware of the fact that it has been proposed to use the acetates of polyglycols as plasticizers in the manufacture of nitrocellulose. These compositions, however, are unsatisfactory in that they are soluble in water to an extent which renders them unsuited for nitrocellulose film manufacture.

I have further found that these plasticizers may be employed in the resin arts. Thus, for example, one may incorporate with a resin containing a phenol aldehyde condensation product or a glycerol phthalic anhydride condensation product as its base, a quantity of these ether esters whereby the resulting product is rendered more flexible, less resistant to shock and tougher than otherwise.

An example of the method of applying the principles of the present invention to the cellulose ester art consists in dissolving 100 parts of acetyl cellulose or nitrocellulose in a suitable low boiling solvent containing 50–100 parts of di-ethylene glycol di-phenoxy acetate. The resulting mixture is spread in a thin layer on a smooth surface to permit the evaporation of the low boiling solvent; a tough, flexible, clear, light resistant film remains.

To illustrate the manner of employing the ester compositions in the resin arts one may flux 50 parts of phenol formaldehyde resin, which is in the fusible form and mix 20–30 parts of di-ethylene glycol di-phenoxy acetate therewith. Thereafter the material is heated in the usual manner to form an infusible mass. The resulting product will be found to be more flexible if molded in thin sheets and less susceptible to fracture than a product which is formed without the modifying agent.

In a manner analogous to that described in connection with the phenol aldehyde resin one may mix 50 parts of a polycarboxylic-polyhydric alcohol resin such as glycerol phthalate anhydride resin, which has not been heated sufficiently to produce infusibility, with 15–30 parts of diethylene glycol di-phenoxy acetate after which the material may be heated in the usual manner to form an infusible, clear, flexible product which is tough and less susceptible to fracture than one that is formed without the modifying agent.

A large number of specific compounds fall within the class of esters contemplated by the present invention. Thus one may employ various polyglycols including diethylene glycol, dipropylene glycol, ethylene propylene glycol and their analogues. Among the acids which may be employed advantageously, all of which are monocarboxylic acids containing an aromatic nucleus are: phenoxy fatty acids such as phenoxy acetic acid or trichlor phenoxy acetic acid, the corresponding cresoxy derivatives, etc.

What I claim is:

1. A neutral polyglycol ester of a phenoxy acetic acid.
2. A polyglycol ester of a phenoxy acetic acid.
3. A neutral ester of diethylene glycol and phenoxy acetic acid.
4. A neutral diethylene glycol ester embodying at least one phenoxy acetic acid group.

MICHAEL N. DVORNIKOFF.